F. KING.

Gas Generator.

No. 4,457. Reissued July 4, 1871.

Inventor,
Ferdinand King,
By S. S. Coombs
Attorney

Witnesses,
Chas. L. Coombs
Jos. L. Coombs

THE NORRIS PETERS CO., PHOTO-LITHO., WASHINGTON, D. C.

UNITED STATES PATENT OFFICE.

FERDINAND KING, OF RICHMOND, VIRGINIA.

IMPROVEMENT IN THE MANUFACTURE OF ILLUMINATING-GASES.

Specification forming part of Letters Patent No. 74,230, dated February 11, 1868; reissue No. 4,457, dated July 4, 1871.

*To all whom it may concern:*

Be it known that I, FERDINAND KING, of Richmond, in the county of Henrico and State of Virginia, have invented a new and useful Improvement in Bituminized Hydrogen-Gas Generators; and I do hereby declare that the following is a full, clear, and exact description thereof, reference being had to the accompanying drawing and to the letters of reference marked thereon, in which—

Figure 1:
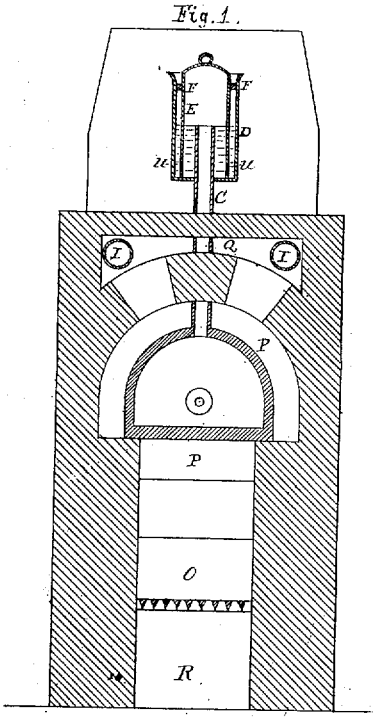
Figure 2:
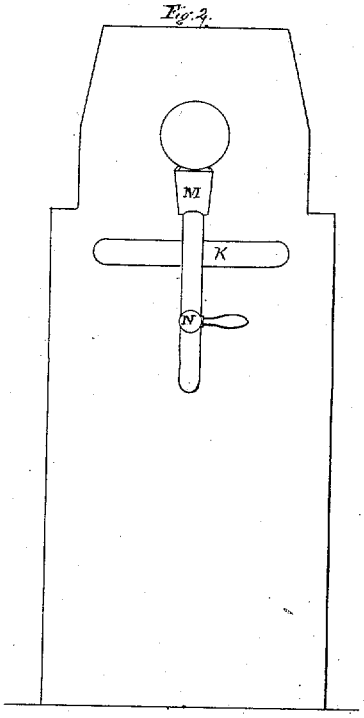
Figure 3:
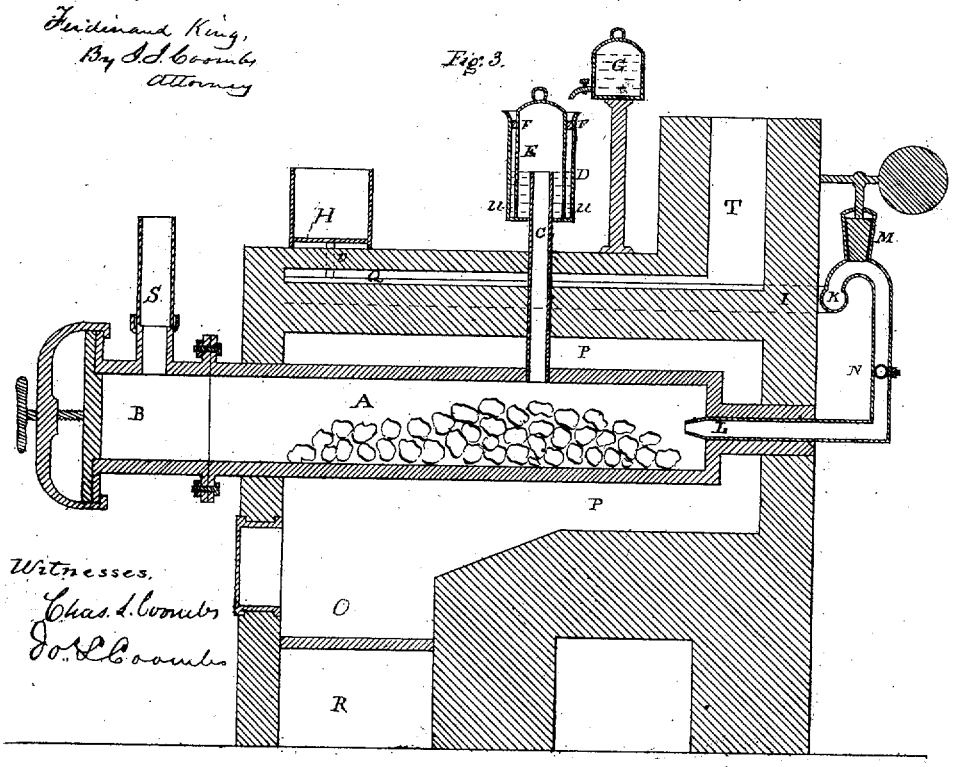

Figure 1 is a vertical cross-section through the central part of the generator. Fig. 2 is a rear elevation, and Fig. 3 is a vertical longitudinal section of the same.

A is a retort, filled with coke; B, a head-piece with discharging-pipe S. C is a pipe for conducting the dissolved tar or other liquid hydrocarbon from vessel D to retort A. E is a cylindrical vessel, open at the bottom and closed at the top, with orifices U and lugs or catches F to hold it down in the vessel D, the orifices U allowing the dissolved tar or other liquid hydrocarbon running into said vessel D from the reservoir G to pass into the vessel E and thence into the pipe C, the said vessels D and E forming at the same time a hydraulic closer or seal to prevent the generated gas from forcing out the tar or other hydrocarbon. H is a water-reservoir connecting, by a branch pipe, *v*, with two steam-pipes, I I, in which the steam is generated. The generated steam passes from said pipes I I into pipe K, and thence through steam-jet L into the red-hot retort A, where it is decomposed. At the same time the dissolved tar or other liquid hydrocarbon is flowing into the retort A through the pipe C, and a simultaneous reaction and combination will instantly take place between the carbureted hydrogen introduced in the dissolved tar or other liquid hydrocarbon and the hydrogen produced from the decomposed steam, and the result is carbureted hydrogen gas escaping through the pipe S. The retort A is partially filled with coke or other equivalent material, which should be heated to an incandescent state, and the steam and hydrocarbon liquid are introduced into said retort simultaneously. The escape-pipe S is much larger than the steam-jet L, so that the steam creates very little pressure in the retort, but forces the gas rapidly along and out of the same, leaving very little sediment or residuum in the retort. M is a safety-valve; N, a steam-cock to regulate the flow of steam; R, the ash-pit; O, the furnace; and P, Q, and T are fire-flues.

I am aware that steam has been introduced into a red-hot retort containing incandescent coke, and afterward mixed with hydrocarbon vapor in a separate retort or receiver; but I regard it as essential to my invention that the hydrocarbon liquid and the steam be both introduced into the retort A at the same time, and simultaneously thrown upon the incandescent coke therein.

I do not limit myself to the precise construction of my apparatus as herein described, as it is manifest the same may be varied without changing its principles of operation; but

What I claim as my invention, and desire to secure by Letters Patent, is—

1. A retort containing coke or other equivalent material, so combined with a fire-furnace as to be subjected to a high degree of heat, with a steam-jet and a jet of liquid hydrocarbon simultaneously discharging therein, the whole being so constructed and arranged that the steam will force the gas rapidly from the retort, substantially as described.

2. The improved gas-generator herein described, constructed to operate substantially as set forth.

3. In combination with a retort, A, and a hydrocarbon reservoir, the two vessels, D and E, and the pipe C, constructed and arranged substantially as described, for introducing the dissolved tar or other liquid hydrocarbon into the retort.

FERDINAND KING.

Witnesses:

JOS. L. COOMBS,

CHAS. L. COOMBS.